United States Patent [19]
Edelberg

[11] Patent Number: 5,158,459
[45] Date of Patent: Oct. 27, 1992

[54] FREESTANDING INTEGRATED CONTROL STICK, RUDDER PEDALS, AND THROTTLE FOR COMPUTERIZED AIRCRAFT FLIGHT SIMULATION PROGRAM

[76] Inventor: Ralph Edelberg, 3926 Swarthmore Rd., Durham, N.C. 27707

[21] Appl. No.: 548,587

[22] Filed: Jul. 5, 1990

[51] Int. Cl.$^5$ .................. G09B 9/08; G09B 19/16
[52] U.S. Cl. .................................. 434/45; 434/43
[58] Field of Search ............... 434/45, 43, 29, 30, 434/35, 37, 38; 244/233, 234, 235, 236; 273/148 B, 85 G, DIG. 28; 272/1 C, 314; 446/7, 94

[56] References Cited

U.S. PATENT DOCUMENTS

| | | | |
|---|---|---|---|
| 1,953,954 | 4/1934 | Constable | 434/30 |
| 2,442,289 | 5/1948 | Garehime | 244/235 |
| 3,517,446 | 6/1970 | Corlyon et al. | 343/45 |
| 4,386,914 | 6/1983 | Dustman | 434/32 |
| 4,659,313 | 4/1987 | Kuster et al. | 434/45 |
| 4,713,007 | 12/1987 | Alban | 434/45 |

OTHER PUBLICATIONS

Williams, Guy R., The World of Model Aircraft, ©1973 André Deutsch Limited, pp. 168, 172, 173, 179, & title page.

*Primary Examiner*—Richard J. Apley
*Assistant Examiner*—D. F. Crosby

[57] ABSTRACT

An accessory apparatus for use with computerized airplane flight simulations providing full-size control for elevator, ailerons, rudder, and throttle. Apparatus is free-standing and includes a single compact partially collapsible frame which is anchored by the user's chair. Electronics are provided by user in the form of two conventional dual-axis analog computer joysticks which are removably installed in unmodified form in the accessory. Control stick, rudder pedals, and throttle arrangement mimics that of typical airplanes. Means are provided to adjust the trim position of the rudder, elevator, and (on the yoke configuration), the ailerons. Controls for elevator, rudder, and ailerons are spring-loaded to simulate control forces in an airplane and may be damped for additional realism.

8 Claims, 6 Drawing Sheets

FREESTANDING INTEGRATED CONTROL STICK, RUDDER PEDALS, AND THROTTLE FOR COMPUTERIZED AIRCRAFT FLIGHT SIMULATION PROGRAM

BACKGROUND OF THE INVENTION

1. Field of the Invention

The present invention relates generally to the field of accessories for computerized simulation programs and more specifically to a device which simulates the major controls of an airplane for use with computerized flight simulation programs, and which utilizes the user's existing computer joysticks.

2. Description of the Prior Art

Within the last several years numerous flight simulation computer programs have appeared on the market and have enjoyed great popularity. An example is "Flight Simulator," sold by the Microsoft Corporation of Redmond, Wash., which has been popular with the general public for entertainment use and also with individuals who are or who intend to be enrolled in a formal flight training course. Until recently the only devices available, other than the computer keyboard itself, to operate certain flight controls in such simulation programs were small computer joysticks.

There are several problems with such use of joysticks. First, the short throw of the joystick lever can result in overcontrol of the ailerons, elevator, rudder, and throttle in the simulation, since the two to four inch total movement of the joystick lever is roughly only one fifth of the corresponding movement of the stick in a real airplane. Secondly, the resistive forces provided by the self-centering springs of the joysticks are a small fraction of the corresponding control forces of the stick and rudder pedals in a real airplane. Thirdly, in the instance of the rudder, the hand control offered by the joystick does not adequately represent the foot pedal control of the rudder in a real airplane. Fourthly, in typical joystick usage the arrangement of the joystick(s) with respect to the user does not reflect the arrangement of the corresponding stick, rudder, and throttle controls with respect to the pilot of a real airplane.

Recently, several devices have been developed to eliminate some of the above problems. Examples are the MAXX Control Yoke manufactured by the Alturas Corporation, of Coeur d'Arlene, Id., and a "Flight Simulation Control Apparatus," U.S. Pat. No. 4,887,966, each of which offers a full size rendition of a modern aircraft wheel type control yoke, provides more realistic resistive forces for ailerons and elevator, and offers a throttle control. These devices are clamped to or positioned atop a computer table or stand in front of the user in a position relative to him or her which represents the position of the control yoke relative to the pilot of a real airplane, and the devices are then connected to the computer through an umbilical cord. Another example is the "Aircraft Controls Simulator," U.S. Pat. No. 4,713,007, in which a cabinet containing a full size control yoke and throttle is placed on the computer table and a second cabinet containing rudder pedals is placed on the floor in an arrangement akin to the control yoke and rudder pedals in a real airplane. Common to these devices is that they incorporate electromechanical componentry which in essence duplicate the function of the electromechanical componentry of conventional joysticks, more specifically that of sensing and electronically transmitting the position of the user-manipulated elements.

A similar series of devices offers full size controls like the above but is designed to function in conjunction with commercially available joysticks. One such device, termed a "Joystick Control Accessory for Computerized Aircraft Flight Simulator Program," U.S. Pat. No. 4,820,162, is an accessory employing a joystick extension tube connected to four springs to produce realistic sensations of control movement resistance. In this accessory the extension tube is mounted directly onto the computer joystick via the small screws in the latter's dome-shaped cap which is removed for the installation, while the joystick housing is immobilized by brackets on the accessory's base. However, the extension appears to be adapted to a particular configuration of joystick rather than many, and provides for a semi-permanent installation thus not facilitating the use of the installed joystick for other purposes. Another device of this type is a "Control Yoke Apparatus for Computerized Aircraft Simulation," U.S. Pat. No. 4,659,313, in which a cabinet containing a control yoke connected to a computer joystick is placed on the computer table. It appears that the joystick is semi-permanently installed in the device and that modification to the joystick may be required for the installation, and thus as in the previous example the installed joystick appears not readily available for other uses.

Another type of device, termed a "Transmitter Extension Apparatus for Manipulating Model Vehicles," U.S. Pat. No. 4,386,914, for use in the general area of radio controlled aircraft, offers full size controls including joystick, throttle, and rudder pedals which are connected to and actuate small joysticks on a separate commercially available radio transmitter. However, this device requires a relatively large platform type base and a built-in dedicated seat. Devices of this type for a computer flight simulation application would be cumbersome to remove from the work station when the user desired to use the computer for another application, and would likely present difficulties in the seated user's access to the keyboard and viewing of the computer monitor.

Many individuals have purchased joysticks for use in various computer programs and games, including flight simulation programs. These joysticks continue to become more sophisticated and expensive such that a pair of the top-of-the-line models may represent a substantial investment in computer game peripheral equipment. Available accessories such as the examples described above do provide relief from one or more of the problems in using joysticks in flight simulation programs. However, as shown above, none of these accessories or devices has the combined attributes of providing full-size controls representing the stick, rudder pedals, and throttle, while utilizing the electronics in the user's existing joysticks, and performing these functions in such a way that minimizes interference with use of these joysticks and/or computer in other applications. The buyer of these devices either must incur an additional expense in paying for duplication of the electromechanical componentry furnished in his existing joysticks (plus lose the opportunity to utilize the excellent operational characteristics of the more expensive joysticks in cases where the user owns such), or must accept the restriction of his existing joystick(s) being relatively unavailable for other applications once installed in the flight simulation device, or must be content with partial primary flight controls (no rudder pedals), or must accept (with a platform type device) that the device will intrude upon the utility of the work station and general work area because of the device's size and will allow less than optimum access to the monitor and keyboard during use, or must accept combinations of such limitations.

SUMMARY OF THE INVENTION

The invention in general can be considered to be a free-standing accessory to a computerized flight simulation program, a main purpose of the accessory being to provide realistic aileron, elevator, rudder, and throttle controls for such simulation. It performs this function while offering several advantages over other similar devices currently available in the marketplace or described in the prior art, these advantages being discussed elsewhere in this disclosure.

The accessory is in essence a temporary host to two dual-axis analog joysticks which have been connected via umbilical cords to a computer on which has been installed a flight simulation program such as "Flight Simulator". The joysticks remain unmodified and can be removed at will from the accessory for other uses. The accessory weighs only a few pounds and can be easily removed from the computer work area when desired. The joysticks are considered to be already owned by the user, or else can be selected and purchased for use in other applications as well as in this accessory. The accessory rests on the floor and is completely free of the need to be mounted to or placed atop a desk or table. Inexpensive commercially available joystick extension cords provide additional joystick umbilical cord length if necessary.

In summary, the accessory consists of a main fore-and-aft member, the "longeron," to which is attached near its front a pivoting rudder bard and a boom-mounted throttle lever, near its center a control stick mounted by means of a dual-axis pivot (universal joint), and near its rear a braced crosspiece which is anchored by the user's chair. The rudder bar, supported by casters at either end which bear on the floor, pivots horizontally about a vertical shaft beneath the longeron. Rubber pedals, which automatically remain pointed straight ahead when depressed, are mounted to either end of the rudder bar. Two computer joysticks are removeably mounted by the user to the longeron near its center, one joystick being linked to the control stick, and the other joystick being linked to the rudder bar and the throttle control. The control stick, which operates the elevator and ailerons in the simulation, is spring biased to a neutral position in both the longitudinal and lateral directions, and is manipulated like the control stick of a real airplane for operation of its ailerons and elevator. The rudder pedals, which operate the rudder in the simulation, are likewise spring biased to a neutral position, and are manipulated like the rudder pedals on a real airplane for operation of its rudder. Similarly the throttle lever, which controls engine speed in the simulation, is manipulated like the throttle control on a real airplane to vary the speed of its engine.

A primary object of the invention is to provide for computerized flight simulation programs at minimal cost the control forces, control size, control arrangement, and control movements typical of the stick, rudder pedals, and throttle in a real airplane.

an additional object of the invention is to serve as host to various makes and models of commercially available joysticks without modification to either the accessory or the joystick, such that any duel-axis analog computer joysticks the user is likely to own will be useful with the accessory, thereby eliminating the cost of duplicating in the accessory the electromechanical componentry already furnished with such joysticks.

Another object of the invention is to minimize interference with other uses of the computer and with other uses of the joysticks after their installation within the invention.

Another object of the invention is to be free of any requirement to clamp or otherwise fasten, mount, or place it upon a desk, stand, table, tray, or other elevated supporting means, thereby eliminating dependance of the invention upon a particular type of elevated supporting means and upon certain space being available thereon.

Another object of the invention is to provide rudder pedals in a configuration which eliminates the possibility of the pedals sliding away from the user or tipping, as could occur with controls which offer a detached pedestal for the rudder pedals.

These and other objects and advantages of the invention will become apparent from the following detailed description when read in conjunction with reference to the drawings.

BRIEF DESCRIPTION OF THE DRAWINGS

The present invention is illustrated by way of example and not limitation in the drawings, in which a given part is referred to by the same number throughout. In describing the invention, specific terminology will be used for clarity. However this is not meant to be restrictive, and each specific term so used is understood to include all technical equivalents which accomplish a similar result by operation in a similar fashion. It is also understood that numerous changes could be made in the details of construction and the arrangement and combination of components without departing from the spirit and scope of the invention as claimed herein.

DETAILED DESCRIPTION OF THE ILLUSTRATED EMBODIMENT

Figure 1:
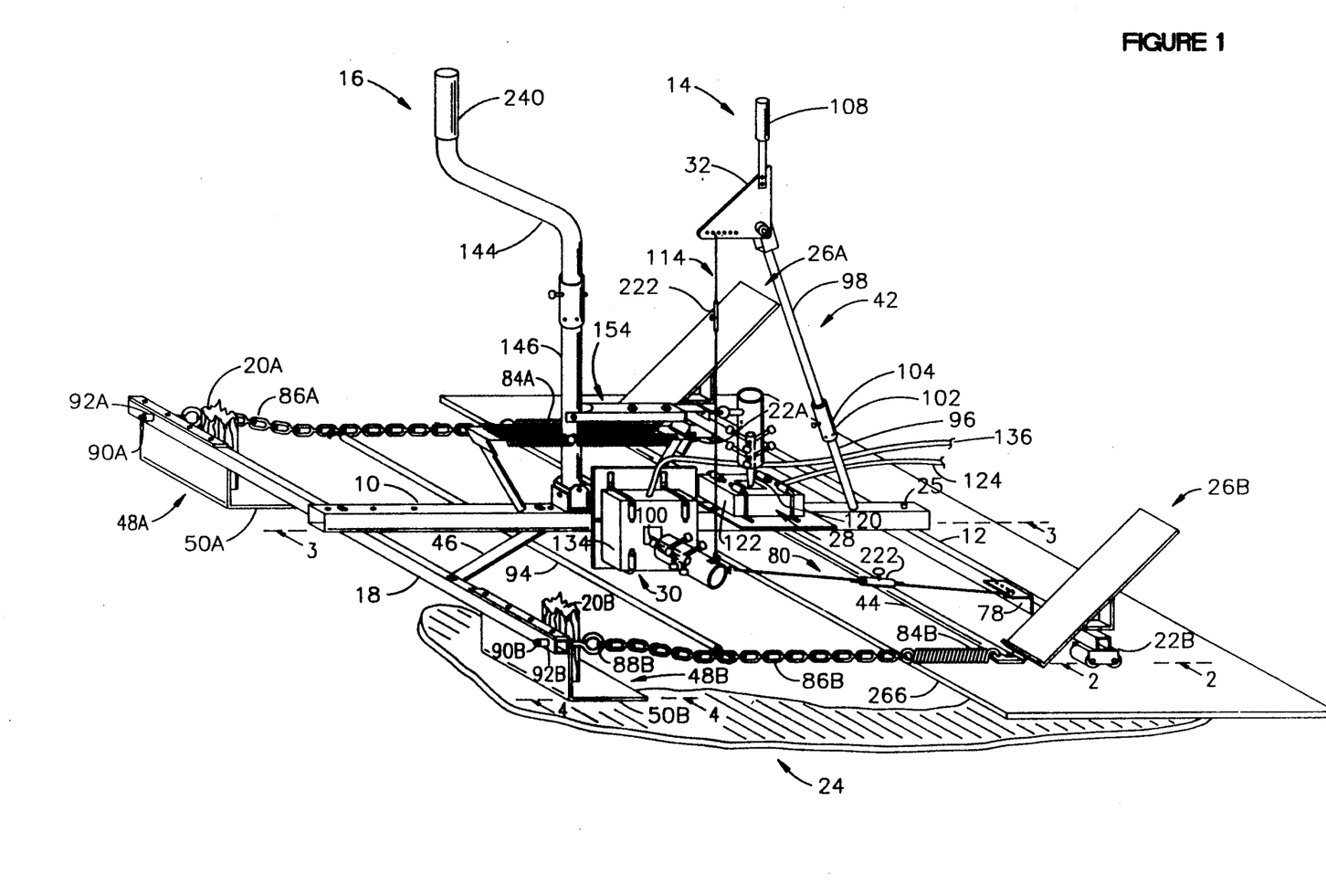
FIG. 1 is a perspective view of the complete accessory, with the computer joysticks installed.

As shown in FIG. 1, the invention generally consists of a main horizontal longitudinal member, "longeron" 10 to which is attached near its front a pivoting rudder bar 12 and boom-mounted throttle control 14, near its center a pivotally mounted dual-axis control stick 16, and near its rear a braced crosspiece 18 which is anchored by front legs 20A and 20B of the user's chair. Rudder bar 12, supported by casters 22A and 22B at either end which bear on floor 24 or caster support surface 266, pivots horizontally at its midpoint about vertical pivot shaft 25 (see also FIG. 3) beneath longeron 10. Rudder pedals 26A and 26B, which automatically remain pointed straight ahead when depressed, are mounted to either end of rudder bar 12. Two computer joysticks 28 and 30 are removeably mounted by the user to longeron 10 near its center, one joystick (A) 28 being linked to the control stick 16, and the other joystick (B) 30 being linked to rudder bar 12 and throttle bellcrank 32.

To provide necessary flat vertical and horizontal faces on certain parts, longeron 10, rudder bar 12, and crosspiece 18 may be made square aluminum tubing. Control stick 16, throttle boom 42, and tie rod 44 may be made from less expensive round aluminum tubing.

The rear of the accessory is supported by horizontal crosspiece 18 removeably bolted beneath longeron 10 and held at right angles to it by means of brace 46. Several holes are drilled vertically in longeron 10 at proper intervals to allow for several different locations of the bolting points for crosspiece 18 and brace 46. Near each outboard end of crosspiece 18 is rivetted Z-shaped bracket 48A and 48B with a horizontal portion, floor pad 50A and 50B, which bears on floor 24, both brackets 48A and 48B being identical. The vertical portion of bracket 48A and 48B is of a dimension which causes longeron 10 to be level in pitch when the accessory is in its operational configuration. Front legs 20A and 20B of the user's chair anchor the accessory by resting on floor pads 50A and 50B, the left leg on left pad 50A and the right leg on right pad 50B. Hence brackets 48A and 48B must be of sufficient width to accommodate both narrow and wide chairs. The distance between the user's chair and rudder pedals 26A and 26B (and stick 16) can be adjusted to sue the user by selection of the particular bolt holes, among the several provided in the rear portion of longeron 10, when attaching crosspiece 18 and brace 46 to longeron 10.

Figure 2:
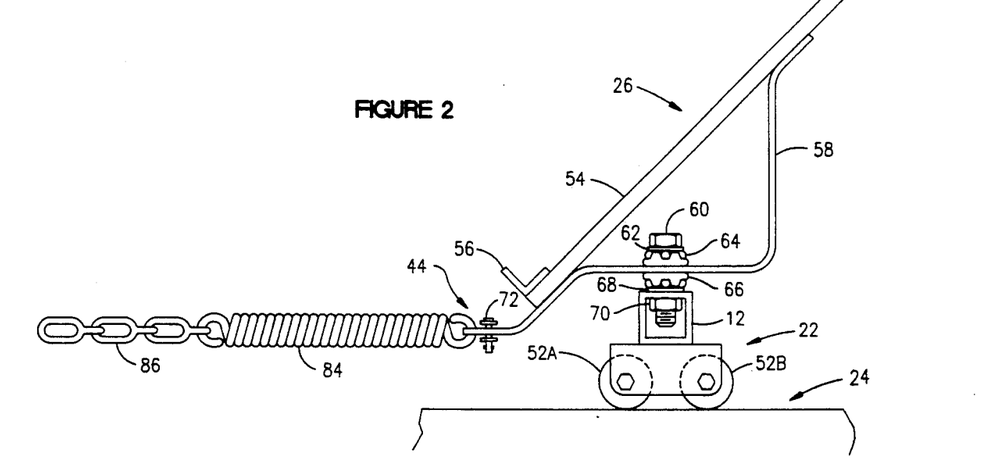
FIG. 2 is an elevational view taken along the lines 2—2 of FIG. 1, and shows the right rudder pedal assembly.
Figure 3:
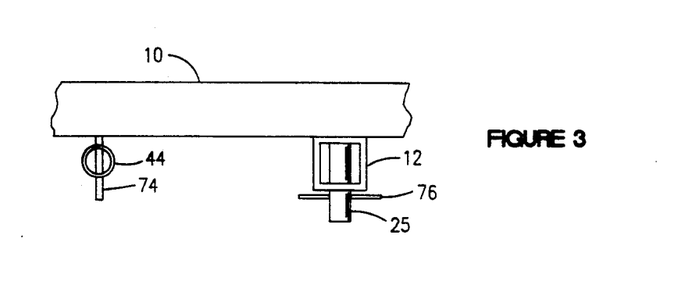
FIG. 3 is an elevational view taken along the lines 3—3 of FIG. 1, and shows the installation of the rudder bar and tie rod.

Details of the rudder pedal assembly are better shown in FIG. 2, with additional reference to FIG. 1. To support the ends of rudder bar 12 on floor 24 while providing for pivotal movement of the rudder bar, two commercially available threaded-stem tandem roller appliance casters 22A and 22B are secured beneath the ends of rudder bar 12 equidistant from its pivot point. The tandem roller arrangement provides better resistance to pitchwise wobbling of rudder bar 12 than would a single roller arrangement. During bolting each caster 22A and 22B is aligned such that the axes of rollers 52A and 52B are parallel to the rudder bar 12. Rudder pedals 26A and 26B are mounted on rudder bar 12 slightly inboard of casters 22A and 22B equidistant from the pivot point of rudder bar 12. Each pedal 26A and 26B consists of foot pad 54, which may be cut from aluminum plate or other rigid flat material, a heel backstop 56 attached to the lower edge of foot pad 54, and support bracket 58 attached to pad 54 along its lengthwise centerline. Bracket 58 is shaped such that it positions foot pad 54 at a comfortable incline to the rear. Rudder pedals 26A and 26B are mounted to rudder bar 12 by means of vertical bolt 60 which passes downwardly through steel washer 62, thrust-type ball bearing 64, bracket 58, second thrust-type ball bearing 66, and second steel washer 68, in that order, and then which penetrates rudder bar 12, and which is secured by self-locking nut 70 beneath rudder bar 12 tightened just enough to eliminate wobbling of pedal 26A and 26B about the axis of bolt 60. Ball bearings 64 and 66 are positioned so that the balls bear on washers 62 and 68. Horizontal tie rod 44 is joined, by means of vertical pin 72 through a pair of ears at either end of tie rod 44, to the rear end of each rudder pedal bracket 58A and 58B. Tie rod 44 is of the specific length such that when installed it keeps rudder pedals 26A and 26B parallel. At its midpoint tie rod 44 pivots about vertical pivot pin 74 (see FIG. 3) protruding beneath longeron 10. The rudder pedal assembly consisting of rudder bar 12, rudder pedals 26A and 26B, and tie rod 44 mounts as an assembly beneath longeron 10 by sliding rudder bar 12 over pivot shaft 25 and simultaneously tie rod 44 over pivot pin 74, as shown in FIG. 3. Rudder bar 12 is secured to pivot shaft 25 by means of locking pin 76 inserted through pivot shaft 25 below rudder bar 12. On rudder bar 12, between pivot shaft 25 and right-hand rudder pedal 26B, is mounted L-shaped rudder bar tab 78 with holes spaced horizontally, one of which is selected to receive rudder link 80 to Joystick B 30. Selecting holes further from the pivot shaft 25 provides more sensitive rudder control.

Figure 4:
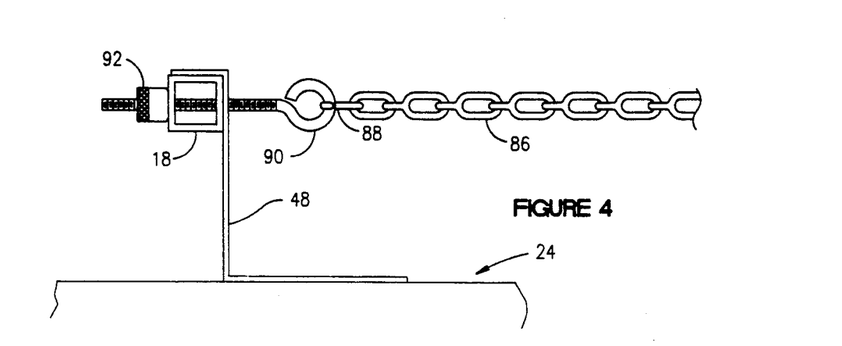
FIG. 4 is an elevational view taken along the lines 4—4 of FIG. 1, and shows the rear terminal of the rudder tensioning chain.

To the rear end of each rudder pedal bracket 58A and 58B is attached extension spring 84A and 84B respectively, each spring applying a force of about 8 lb./inch of extension, this arrangement providing centering and resistive forces for rudder pedals 26A and 26B. The other end of each spring 84A and 84B is hooked about one end of respective lightweight chain 86A and 86B, the other end of which is attached by hook 88A (not shown) and 88B to eyebolt 90A and 90B horizontally inserted through the nearest end of crosspiece 18, as can be seen more clearly by additional reference to FIG. 4. At the rear end of each eyebolt 90A and 90B knurled nut 92A and 92B is provided for fine adjustment of free length of the eyebolt. By selection of the particular links in chains 86A and 86B for left-hand 26A and right-hand 26B pedals and subsequent adjustment of the protruding length of each eyebolt 90A and 90B, the rudder pedals can be adjusted so that when in their undepressed neutral position, they are centered, chains 86A and 86B both taught, the springs 84A and 84B to the point of just initiating expansion. Alternatively, knurled nuts 92A and 92B may be rotated in a manner to bias rudder bar 12 (see FIG. 1), and thus rudder pedals 26A and 26B, to a desired non-centered position to simulate rudder trim. At approximately the midpoint of left-hand 86A and right-hand 86B chains elastic member 94, such as an elastic band or a chain spring-loaded by an extension spring, is attached and acts to prevent the slack chain from dragging the floor when the pedal 26A and 26B on the opposite side is depressed.

Figure 5:
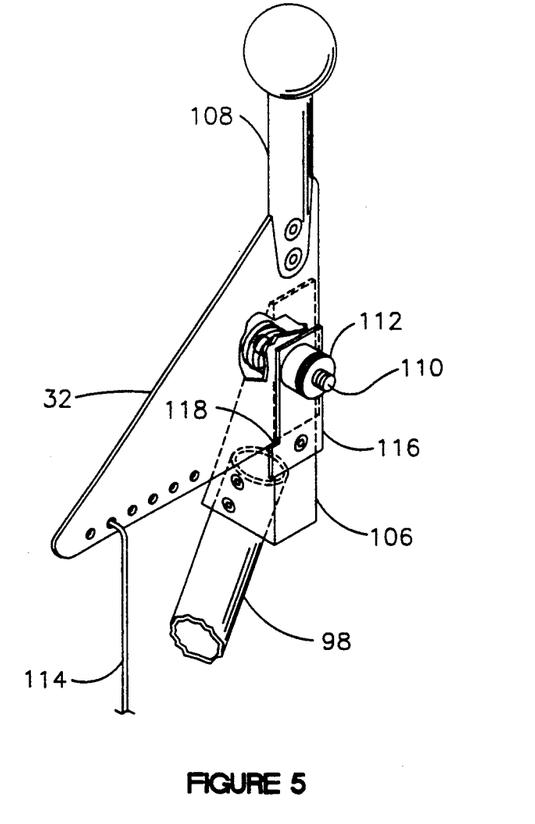
FIG. 5 is a perspective view of the throttle actuation assembly.

Throttle boom 42 consists of lower section 96 and upper section 98. The lower section is permanently installed on longeron 10 generally between pivot shaft 25 and pivot pin 74. The lower section is inclined such that when upper section 98 is installed, bellcrank 32 mounted at its upper end will be located on the order of 20" above (and as directly above as possible) the end of Joystick B lever 100 to which it will be linked. Rivetted to lower throttle boom section 96 is a sleeve 102 into which the upper boom section 98 is removeably inserted and secured with clevis pin 104. Details of the throttle operation assembly are better shown in FIG. 5. At the top end of upper boom section 98 throttle bracket 106 is rivetted such that one face lies in a vertical plane parallel, to longeron 10. The bellcrank 32, rotated by the user by means of attached throttle lever 108, is pivotally bolted to the vertical face of bracket 106 by a spring-loaded bolt 110 secured by knurled nut 112 which is tightened or loosened to provide the desired resistance to movement of throttle lever 108. Drilled into throttle bellcrank 32 on a radius extending for the pivot point are a series of holes any one of which may be selected for insertion of throttle link 114. Selecting holes further from the pivot point provides more sensitive throttle control. Small tab 116 inserted between bellcrank 32 and knurled nut 112 and rivetted to bracket 106 prevents nut 112 from turning with bellcrank 32. Tab 116 has stop 118 to limit the rotation of the bellcrank 32, and thus throttle lever 108, to a predetermined fully "throttled back" position. In an alternate configuration to the quadrant type throttle described above, bellcrank 32 may be actuated by a push-pull type throttle handle (not shown) by installation of such a handle on throttle boom 432 and appropriate linkage between the handle and the bellcrank.

The computer joystick controlling the elevator and ailerons in the simulated program, Joystick A 28, is placed on top of longeron 10 behind throttle boom 42, and oriented so that joystick lever 120 protrudes upward and the port in housing 122 for umbilical cord 124 faces straight forward. Joystick A 28 is removeably secured in this position by means of a clamping assembly, shown in detail in FIG. 6. In this clamping assembly, four L-shaped bolts 318, 320, 322, and 324 are used to secure the Joystick A housing 122 to tray 306. The four bolts penetrate the tray and are secured and tightened by nuts on the opposite face of the tray. Each bolt is provided with a rudder foot 326 at the clamping end to eliminate slipping of the bolt on housing 122 during clamping. In some applications a pair of bolts (rather than four) may be sufficient to secure joystick housing 122 to tray 306. Tray 306 is mounted to longeron 109 by means of two bolts 316 each of which penetrates the longeron and passes through a separate longitudinal slot cut on approximately the centerline of the tray, the slots providing means to adjust the position of the tray on the longeron. Two vertical threaded rods 130A and 130B each penetrating one end of the pair of brackets 126 and 128 and firmly fastened by an upper and lower nut to lower clamping bracket 128, and knurled nut 132A and 132B atop respective rod 130A and 130B which is tightened against upper clamping bracket 126 to hold joystick housing 122 firmly in position on longeron 10. The computer joystick controlling the rudder and throttle in the simulation program, Joystick B 30, is placed behind Joystick A 28 and oriented such that lever 100 of Joystick B 30 protrudes to the right and the port in housing 134 for umbilical cord 136 faces upward. Joystick B 30 is removeably secured in this position by means of a clamping assembly similar to the previous one as shown in detail in FIG. 7, positioned vertically across the right (normally top) face of. Properly mounted joysticks 28 and 30 will lie between throttle boom 42 and control stick 16.

Figure 8:
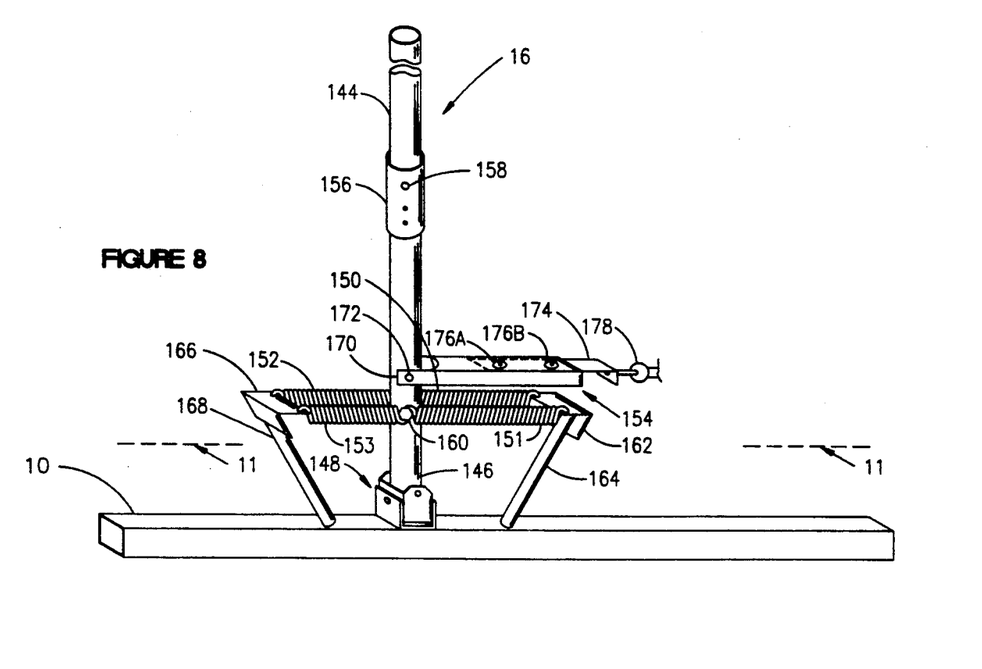
FIG. 8 is a perspective view of the lower section of the control stick and components attached thereto.

Control stick 16 consists of upper section 144 and lower section 147. The componentry about the lower vicinity of the control stick may be better understood by primary reference to FIG. 8. Lower section 146 of the stick is pivotally mounted to the top face of longeron 10 at approximately its lengthwise midpoint by means of dual-axis universal joint 148. Attached to lower section 146 of the stick, to provide lateral and longitudinal centering and resistive forces, are four generally parallel centering springs 150, 151, 152, and 153. Above the centering springs and control stick line 154, rivetted to lower stick section 146 is sleeve 156 into which upper stick section 144 is removeably inserted and secured with clevis pin 158. Upper section 144 of the stick may be straight or provided with a reflex curve to the rear as found in some airplanes. Four centering springs 150, 151, 152, and 153, which are of the extension type and which each apply a force of about 8 lb./inch extension, are attached to lower stick section 146 several inches above its lower end by hooking the springs over cottered pin 160 inserted laterally into lower stick section 146, two springs 151 and 153 on the right side and two springs 150 and 152 on the left side. One spring 150 and 151 from each side is hooked at its other end to bracket 162 on forward post 164, and one spring 152 and 153 from each side is hooked at its other end to bracket 166 on rearward post 168, such that each post anchors two generally parallel and horizontal springs. (In an alternate configuration each pair of springs 150/151 and 152/153, could be replaced by a single stronger spring anchored to an appropriate attachment fitting on lower stick section 146). Each post 164 and 168 is firmly installed in a generally vertical position to longeron 10 (but posts may also be inclined away from lower stick section 146). Installed springs 150, 151, 152, and 153 bias control stick 16 to an approximately vertical position and are uniformly extends about 1¼ inch each when the stick is so positioned. Pinned laterally to lower stick section 146 slightly above centering springs 150, 151, 152, and 153 is control stick link 154, which connects Joystick A 28, controlling elevator and ailerons, to control stick 16 of the accessory. Control stick line 154 consists of channel-shaped member 170, generally parallel to longeron 10, with two vertical ears formed at the stick end through which pin 172 is inserted; tongue 174 protruding forward of and slidably fastened within channel shaped member 170 by two bolts 176A and 176B passing through slots in tongue 174; and small commercially available universal joint 178, such as the type used in model airplanes, which is attached to a downwardly projecting vertical tab at the front end of tongue 174. The length of control stick link 154 is adjusted to suit the distance between control stick 16 and connected Joystick A 28 (see FIG. 1) by extending or retracting tongue 174 and tightening the bolts 176A and 176B when tongue 174 is properly positioned.

Figure 6:
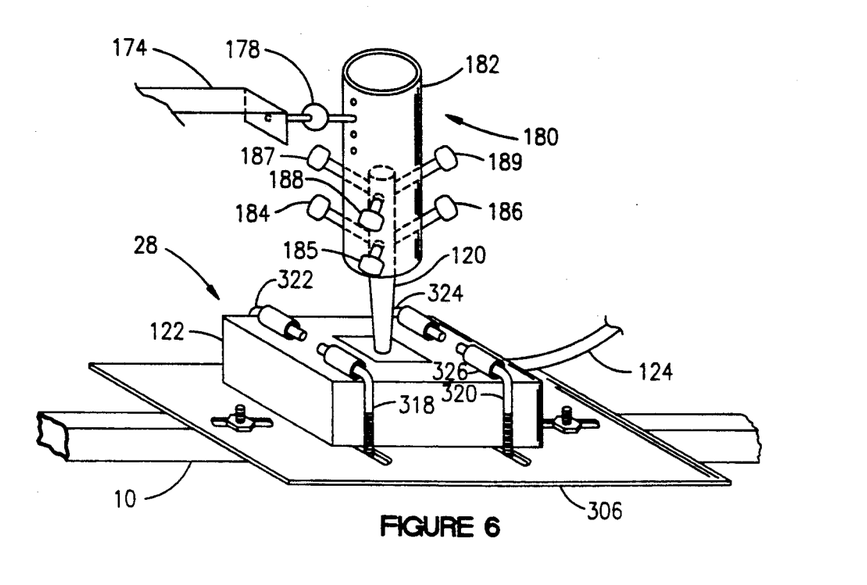
FIG. 6 is a perspective view of Joystick A, controlling the elevator and ailerons, showing its mounting method, and connections thereto.

As best shown in FIG. 6, the other end of universal joint 178 is fastened to joystick receiving tube 180 for Joystick A 28 in one of several selectable holes drilled along a vertical line along the middle area of receiving tube 180. The receiving tube consists of cylinder 182 open at both ends which may be cut from aluminum tubing. Cylinder 182 has two sets of three thumb screws 184, 185, 186, 187, 188, and 189, 190, 191, 192, 193, 194, and 195 which penetrate its wall, the thumb screws within each set being spaced 120 degrees apart on a given circumference. One set 184, 185, and 186 is located at the lower end of tube 180, one set 187, 188, and 189 is located toward the upper end of tube 180. After receiving tube 180 is placed over lever 120 of Joystick A 28, six thumb screws 184, 185, 186, 187, 188, and 189 are tightened about lever 120 to secure it firmly and approximately centered within receiving tube 180. This arrangement of thumb screws permits securing a variety of shapes of joystick levers, whether cylindrical or more or less bulbous shaped. Receiving tube 180 is positioned low enough on lever 120 to firmly secure it but not so low that tube 180 sticks joystick housing 122 when lever 120 is displaced. Receiving tube 180 is of a diameter large enough to accommodate the range of typical sizes of joystick levers 120 furnished on joysticks available on the market. Two or three diameters of receiving tubes 180 would accommodate the entire range of all joystick levers 120 available. For models of joystick which incorporate a lever having an azimuthal protuberance at its upper end, cylindrical receiving tube 180 may be easily modified to assume a cross-section of elliptical shape and thumb screws 184, 185, 186, 197, 188, and 189 relocated as necessary in optional auxiliary holes (not shown) to secure joystick lever 120.

Figure 7:
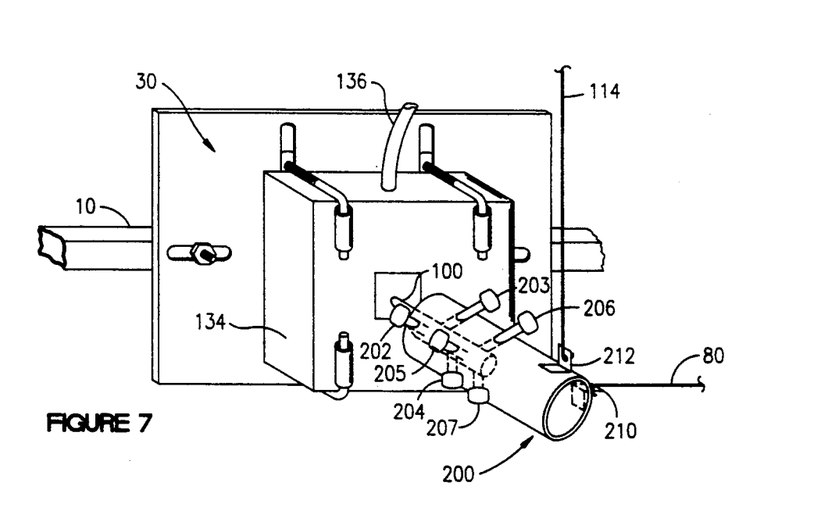
FIG. 7 is a perspective view of Joystick B, controlling the rudder and throttle, showing its mounting method, and connections thereto.
Figures 9, 10:
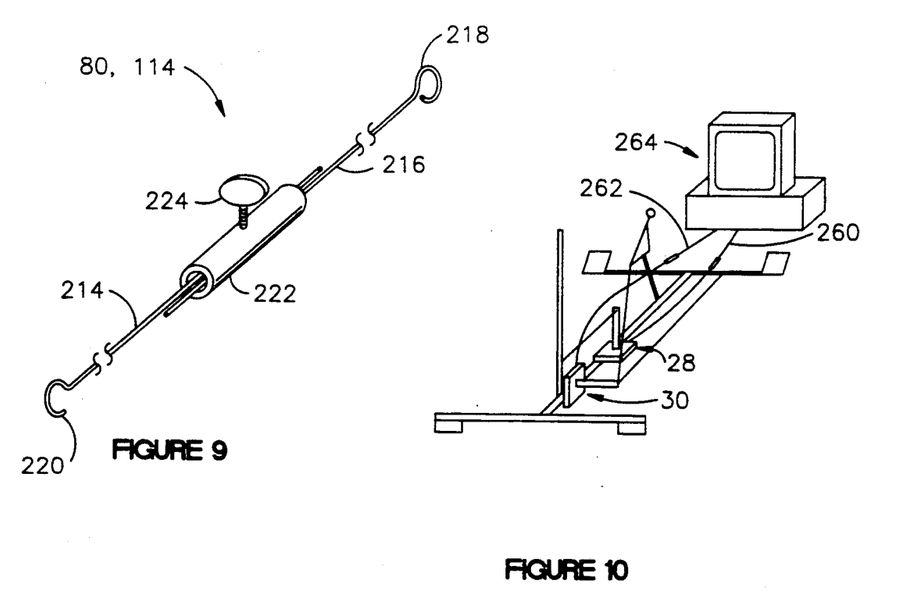
FIG. 9 is a perspective view of the connectors used in the linkages for the rudder and throttle.
FIG. 10 is a drawing showing the relationship among the accessory, the user's joysticks, and the computer.

As best shown in FIG. 7, second joystick receiving tube 200 is mounted on lever 100 of Joystick B 30 in the same manner as first joystick receiving tube 180 is mounted on Joystick A 28. This receiving tube is the same as the first one, having two sets of thumb screws 202, 203, 204, 205, 206, and 207, but instead of a universal joint it has attached at its "upper" end (furthest from the joystick housing) two tabs 210 and 212, which are oriented radially and parallel to the lengthwise axis of tube 200, one 212 extending above tube 200 to which throttle link 114 is hooked, and one 210 extending forward of tube 200 to which rudder link 80 is hooked. The construction of the links is illustrated in FIG. 9. Each of links 80 and 114 consists of two lengths of thin diameter metal rod 214 and 216, such as push-pull rod for model aircraft control assemblies, of which one end of each rod 214 an 216 is fashioned into small eyes 218 and 220. Rods 214 and 216 are overlapped at their straight ends within connector 222, which is a short section of tubing of a diameter just large enough to slip over the overlapping portion of the rods, connector 222 incorporating thumb screw 224 at its midpoint which is tightened to bear upon and thus secure rods 214 and 216 against the inside wall of connector 222 in an immovable manner. Installation of the linkages for rudder and throttle control can be best understood by reference to FIGS. 7 and 9 primarily, and to FIGS. 1 and 5 additionally. To install rudder link 80, thumb screw 224 is first loosened, and then one eye 220 is hooked to forward-mounted tab 210 and the other end 218 is hooked to rudder bar tab 78 through one of its holes. The length of link 80 is adjusted by sliding the overlapping portions of rods 214 and 216 with respect to each other until Joystick B lever 100 is in its laterally neutral position when rudder pedals 26A and 26B are centered, and then tightening thumb screw 224. Throttle link 114 is installed and adjusted in a similar way to top-mounted tab 212 and to throttle bellcrank 32 through one of its holes, except that the link adjustment is made such that bellcrank 32 is against its "throttled back" stop 118 when Joystick B lever 100 is at the rear limit of travel along its own fore-and-aft axis.

to prepare for operation, the user's Joystick A 28 operating elevator and ailerons in the simulation is horizontally mounted behind throttle boom 42 to the upper face of longeron 10 by four bolts 318, 320, 322, 324, and tray 306 and then Joystick A lever 120 is secured within Joystick A receiving tube 180 by tightening six thumb screws 184, 185, 186, 187, 188, and 189 against Joystick A lever 120, as best seen by reference to FIGS. 1 and 6. Similarly the user's Joystick B 30 operating rudder and throttle in the simulation is vertically mounted behind Joystick A 28 to the right face of longeron 10 and then Joystick B lever 100 is secured within Joystick B receiving tube 200 by tightening six thumb screws 202, 203, 204, 205, 206, and 207 against Joystick B lever 100, as best seen by reference to FIGS. 1 and 7. An understanding of the linkage adjustments may be had by reference to FIGS. 1, 6, and 7. Linkage lengths are adjusted at control stick link tongue 174, connector 222 for rudder link 80, and connector 222 for throttle link 114 such that joystick levers 120 and 100 are correctly positioned, specifically that Joystick A lever 120 is centered along both its axes when control stick 16 is in its spring-centered neutral position, that Joystick B lever 100 is laterally centered when rudder bar 12 is in its spring-centered neutral position, and Joystick B lever 100 is at the rearmost point along its fore-and-aft axis when throttle bellcrank 32 is at "idle stop" 118 (see FIG. 5). For best operation, it may be necessary to slightly rotate Joystick B housing 134 (clockwise when viewed from right) during installation on longeron 10 in order to obtain the orientation which nullifies slight cross-effects of rudder and throttle operation which could occur in some installations. Readjustment of linkages 80, 114, and 154 (174) after reinstallation of removed joysticks 28 and 30 should not be necessary provided each joystick 28 and 30 is reinstalled in the same respective position on longeron 10. If necessary, commercially available joystick extension cords 260 and 262 may be used to provide additional umbilical cord length for joysticks 28 and 30 for their connection to computer 264, as FIG. 10 illustrates.

Front legs 20A and 20B of the user's chair are placed on floor pads 50A and 50B of crosspiece 18 to prevent the accessory from sliding over floor 24, and if the floor is carpeted, thin rigid flat caster support surface 266 is placed on the floor beneath rudder casters 22A and 22B to provide a smooth rolling surface, as seen in FIG. 1.

After installation of joysticks 28 and 30 and flight simulation program on computer 264 (see FIG. 12), stick 16, rudder pedals 26A and 26B, and throttle lever 108 are operated in the same manner they would be in a real airplane: stick 16 forward for nose down, back for nose up, left for left roll, right for right roll; right rudder pedal 26B depressed for right yaw, left rudder pedal 26A depressed for left yaw; throttle lever 108 forward to increase engine speed. Movement of full size controls 16, 26A, 26B, and 108 causes movement of computer joystick levers 120 and 100 in the proper directions and magnitudes via linkages 154, 80, and 114 such that the computer simulated elevator, ailerons, rudder, and throttle respond appropriately.

The user may substitute stronger or weaker springs 150, 151, 152, 153, 84A, and 84B for those on stick 16 and/or rudder pedals 26A and 26B to accommodate personal preference or to simulate generally faster or slower airspeeds respectively. Different users' leg lengths may be accommodated by selection among several bolt-hole locations in longeron 10 when bolting the crosspiece to the longeron (with corresponding adjustment in the length of chains 86A and 86B). Sensitivity of the elevator, rudder, and throttle controls can be varied by selection among several link-connection holes provided on Joystick A receiving tube 180, rudder bar tab 78, and throttle bellcrank 32, respectively.

For temporary storage, the accessory may be partially disassembled in several stages to the point necessary. To reduce in height, the upper section of stick 144 is separated from lower section 146, and upper section 98 of the throttle boom is separated from lower section 96, and from throttle linkage 114. For additional breakdown, springs 84A and 84B and chains 86A and 86B and are removed from rudder brackets 58A and 58B and crosspiece 18 which is in turn detached from longeron 10 and brace 46. The assembly consisting of rudder bar 12, pedals 26A and 26B, and tie rod 44 is removed from pivot shaft 25 and pivot pin 74 (see FIG. 3), and link 80 is removed from rudder bar tab 78. The detached parts are placed alongside longeron 10 in a compact storage configuration.

Figure 11:
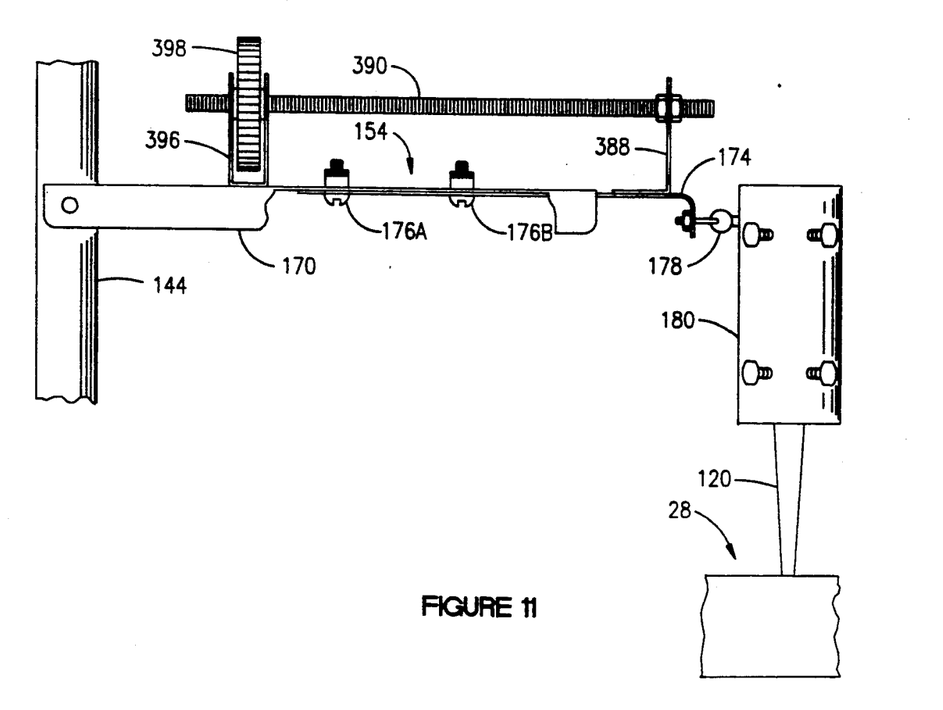
FIG. 11 is an elevational view taken along the lines 11—11 of FIG. 8, and shows modification providing elevator trim.

To provide a means to trim the elevator in the simulation, shown in FIG. 11, forward bracket 388 is attached to the forward end of the upper face of tongue 174. Threaded rod 390 is firmly fastened to bracket 388 such that rod 390 is parallel to the centerline of tongue 174 and extends rearward from the bracket. U-shaped rear bracket 396 is attached near the rear end of the upper face of channel-shaped member 170 such that the trough of the bracket is at right angles to the centerline of channel-shaped member 170. Trim wheel 398 which is threaded on the inner bore is captured within rear bracket 396 and has spacers on either side to eliminate play between trim wheel 398 and bracket 396. Threaded rod 390 passes through a hole in the front of rear bracket 396, then engages the threads of trim wheel 398, and finally emerges from bracket 396 through a hole in its rear. Tongue bolts 176A and 176B, passing through slots in tongue 174 as previously, are tightened sufficiently to eliminate play between tongue 174 and channel-shaped member 170 but not to the point of preventing sliding of the tongue during the trimming operation. Alternatively the tongue bolts may be eliminated and the tongue may be positioned by lateral grooved guides attached to channel-shaped member 170. Trimming is accomplished by rotating trim wheel 398 to the right or left as necessary to adjust Joystick A lever 120 to the desired trim position.

To trim the rudder in the simulation, connector 222 in FIG. 9 is replaced with a small turnbuckle (not shown) on which is mounted a trim wheel to facilitate rotation of the turnbuckle. The ends of link rods 214 and 216 are threaded to mate with the turnbuckle. By rotating the trim wheel, and thus the turnbuckle, the length of rudder link 80 (see FIG. 1) is changed, thereby changing the position of Joystick B lever 100 (see FIG. 7) along its rudder travel corresponding to the centered position of the rudder pedals and thus trimming the rudder in the simulation.

Figure 12:
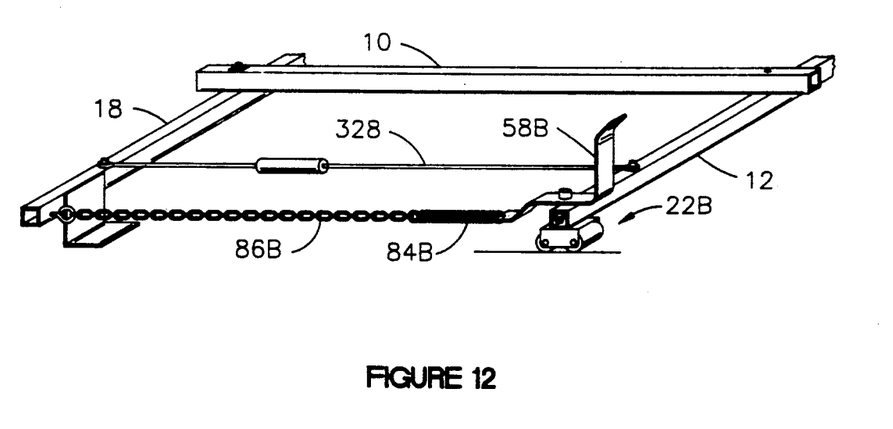
FIG. 12 is a perspective view of a modification providing rudder damping, with the rudder pedal foot pad omitted for clarity.

In another modification, dampers may be added to the control stick and to the rudder pedals to simulate the inertia of a real aircraft control system. Such dampers would reduce or eliminate the "bounce" in the controls in the accessory upon their sudden release, which is due to the use of springs to provide centering and resistive forces coupled with the relatively small inertia of the control assemblies in the accessory. The dampers would also increase the realism in the feel of the controls during their respective actuation stroke. These commercially available dampers are of the cylinder and rod type, double-acting, and may be hydraulic or pneumatic in operation. Each damper is installed generally parallel to the spring to be damped. FIG. 12 shows the installation of rudder damper 328 one end of which may be pinned to either left 58A or right 58B rudder pedal bracket and the other end of which is pinned to the respective left end or right end of rear crosspiece 18, though FIG. 12 shows right-hand installation. Single-acting dampers would require the installation of one damper each on the left rudder pedal bracket would damp the right rudder pedal bracket.

Figure 13:
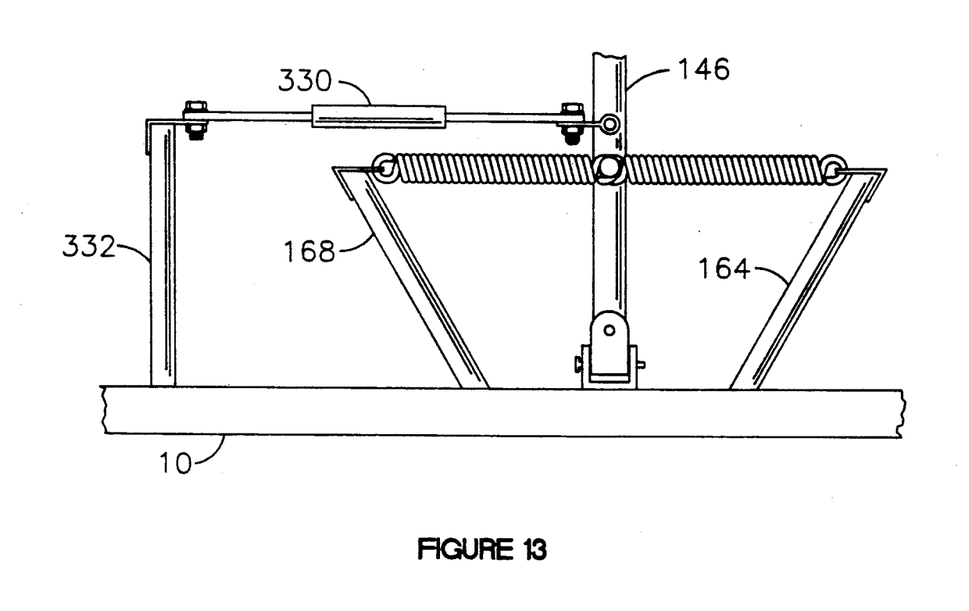
FIG. 13 is an elevational view taken along lines 11—11 of FIG. 8, and shows a modification providing control stick damping.

FIG. 13 shows the installation of control stick damper 330 one end of which is pinned to lower section 146 of the control stick and the other end of which can be pinned to rear post 168 (this installation not shown) or if necessary for additional clearance to second rear post 332 aft of first post 168. Control stick damper 330 in addition to damping longitudinal movement, would damp to a lesser extent lateral movement. Single-acting dampers would require the installation of an additional damper extending between the lower section of control stick 146 and forward post 164. For any of these dampers, in lieu of providing dampers and springs separately, each damper could be installed as a combined or integral damper-and-spring assembly thereby eliminating some of the redundant linkages required if the original springs are retained.

In another modification, the accessory may be constructed such that rudder bar 12 and tie rod 44 in FIG. 1 are positioned above longeron 10 with the result that the rudder bar is not supported by casters riding on the floor. In such a configuration, a front crosspiece generally similar in design to rear crosspiece 18 could be attached to the front end of longeron 10 to provide additional lateral stability and to raise the front of the longeron such that the longeron is level. However in such a configuration it would be necessary to provide a substantial bearing at the rudder bar pivot point, where pivot shaft 25 penetrates longeron 10 in the preferred embodiment, and to provide substantial fastening means at the point of connection of the added front crosspiece to the longeron in order to eliminate lateral wobbling of the rudder bar caused by the weight of the user's legs and feet.

Separate dedicated aileron centering springs could be provided for the basic control stick configuration, such springs being installed on the control stick approximately orthogonally to springs 150, 151, 152, and 153 in FIG. 1, and being anchored by two posts lateral to the control stick pivot point, one post projecting upward and outward from either side of the longeron could be installed, except that the elements in the trim system would be oriented generally laterally and would extend outward from the longeron rather than being in the plane of symmetry as in FIG. 18.

In still another modification, the rudder pedals could be centered by a coil spring or equivalent element resistant bidirectionally to torsion, installed at the rudder bar pivot point such that the longitudinal axis of the coil spring is generally vertical. However such a modification would place additional moments on the longeron which could somewhat affect the stability and/or rigidity of the accessory during rudder pedal operation.

To protect the computer joysticks and associated linkages from the user's feet, "floorboards" could be installed over the lower portion of the accessory. Though not illustrated, such floorboards could generally be in the form of a horizontal platform extending forward of stick 16 just above the main control stick link 154 (see FIG. 1) in the stick version or just above the corresponding square tube (link) 338 (see FIG. 13) in the yoke version. The floorboard platform might be attached by brackets to the main longitudinal frame member of the accessory, or otherwise could be designed to rest on the floor.

For a configuration which employs dedicated rather than removable computer joysticks, a permanent means of mounting the joysticks on the longeron, of linking the joystick levers to the respective controls on the accessory, and of providing an interface to actuate the fire control button on the computer joystick, could be utilized. A related configuration could replace dedicated computer joysticks with dedicated pairs of analog potentiometers, each member of a pair having its axis orthogonal to the other member and each pair being operated by a single lever in the manner of a conventional computer joystick, but such pairs of potentiometers not being manufactured as computer joysticks per se.

It is considered that the various possible combinations of the modifications and alternate configurations described separately herein are part of this invention.

The advantages of the accessory are several. First, for the user who already owns joysticks, the accessory utilizes the electromechanical componentry in such joysticks and thereby avoids the cost of furnishing a redundant set of such componentry as is typically done in other available full size control accessories for computerized flight simulations.

The accessory does not require modification of joysticks for their installation and provides for easy removal of the installed joysticks, which facilitates their use in other applications.

Due to the accessory's small size and weight and capability for quick partial disassembly, it can be removed intact to the side of the computer work station or else stowed in a compact form to avoid interference with the computer for other uses, an advantage which would not shared by, for example, "platform type" cockpit simulators.

Since the accessory is free-standing, it can be used without regard to the type of table, desk, stand, or tray upon which the computer, keyboard, and monitor are placed, and without the need to dedicate space on such tables, desks, stands, or trays to the accessory, a constraint typical of related devices on the market.

The accessory will accommodate various sizes of users by selection of bolting location for two bolts.

Elevator, rudder, and throttle sensitivity can be adjusted to suit user preference, while elevator, aileron, and rudder resistive forces can likewise be adjusted. The location of the throttle control is more realistic than on typical related devices.

Since the rudder pedals are structurally integrated with the main frame of the accessory, the possibility of the rudder pedal mechanism sliding away from the user or tipping, which could occur in devices having a detached rudder pedal mechanism, is eliminated. In addition the pedals automatically remain oriented straight ahead during depression and their action is a fair approximation of pedals on a real airplane, these characteristics in combination not being typically found in devices in the prior art.

The shipment volume of the accessory is significantly less than that of related devices performing similar functions.

What is claimed is:

1. An accessory apparatus for actuating a plurality of dual-axis analog computer joysticks which transmit electrical signals to a computer loaded with a flight simulation program viewed on a monitor, and where the user is seated on a seating means separate from but resting on said accessory apparatus, comprising:

a frame means which rests on floor and to which are structurally connected all components of said apparatus, said frame means being held stationary by transfer of said user's weight to said frame means by said separate seating means, a foot control means pivotally attached to said frame means, said foot control means controlling a rudder in said simulation program, and comprising:

a generally horizontal member pivotally attached to said frame means and which is manipulated by means of the user's feet.

rollable supporting means which bear on said floor and which are attached to said horizontal member, to enable said horizontal member to rotate in a horizontal plane about its pivot point, a first hand control means pivotally attached to said frame means, said first hand control means controlling an elevator and ailerons in said simulation program, a second hand control means attached to said frame means, said second hand control means controlling a throttle in said simulation program, a first means to bias to a neutral position said first hand control means, a second means to bias to a neutral position said foot control means, a means to secure said plurality of dual-axis analog computer joysticks to said frame means, a first, second, and third transmitting means to transmit movements of respective said first hand control means, said foot control means, and said second hand control means to levers of said plurality of dual-axis analog computer joysticks.

2. The apparatus defined in claim 1 wherein:

said frame means comprises a longitudinal member having laterally stabilizing means attached thereto, said means to secure said plurality of dual-axis analog computer joysticks to said frame means comprises a means to secure housings of two separate computer joysticks to said frame means, said first hand control means comprises an elongated and generally vertical handle means pivotally attached to said longitudinal member of said frame means such that free end of said first hand control means can be moved in any horizontal direction, said first transmitting means comprises a first transmitting member pivotally attached to one end thereof to said elongated handle means and engaged at other end thereof to a lever on one of said computer joysticks, for the purpose of moving said lever to a position corresponding to position of said free end of said elongated handle means, said first bias means comprises an opposing pair of tensioning means applied to said elongated handle means, said tensioning means biasing said elongated handle means to a generally vertical orientation, said second bias means comprises an opposed pair of tensioning members of biasing said horizontal member to a predetermined position relative to said longitudinal member, said second transmitting means comprises a second transmitting member pivotally attached at one end thereof to said horizontal member of said foot control means and engaged at other end thereof to a lever on other of said computer joysticks, for the purpose of moving said lever to a position along a first axis of said other computer joystick, such position corresponding to angular position of said horizontal member of said foot control means, said second hand control means comprises:

a pivoting actuating member with handle means, a means for attaching said actuating member to said frame means, remote from said other computer joystick, said third transmitting means comprises a third transmitting member pivotally attached at one end thereof to said actuating member of said second hand control means and engaged at other end thereof to said lever of said other computer joystick, for the purpose of moving said lever to a position along a second axis of said other computer joystick, such position corresponding to angular position of said actuating member of said second hand control means.

3. The apparatus defined in claim 2 wherein said foot control means further comprises:

a left and right pedal means pivotally attached to said horizontal member equidistant from the pivot point of said horizontal member, a means for causing said pedal means during translational movement thereof to remain in a preset azimuthal orientation relative to said longitudinal member of said frame means, 4. An accessory apparatus for actuating a plurality of dual-axis analog computer joysticks which transmit electrical signals to a computer loaded with a flight simulation program viewed on a monitor, and where the user is seated on a seating means separate from but resting on said accessory apparatus, comprising:

a frame means which rests on floor and to which are structurally connected all components of said apparatus, said frame means being held stationary by transfer of said user's weight to said frame means by said separate seating means, and comprising a longitudinal member having laterally stabilizing means attached thereto, a foot control means for controlling a rudder in said simulation program and which comprises:

a generally horizontal member pivotally attached to said longitudinal member of said frame means and which is manipulated by means of the user's feet, rollable supporting means which bear on said floor and which are attached to said horizontal member, to enable said horizontal member to rotate in a horizontal plane about its pivot point, a means to secure housings of two separate computer joysticks to said frame means, a first hand control means for controlling an elevator and ailerons in said simulation program and which comprises an elongated and generally vertical handle means pivotally attached to said longitudinal member of said frame means such that free end of said first hand control means can be moved in any horizontal direction, a first transmitting means for the purpose of moving a lever on one of said computer joysticks to a position corresponding to position of said free end of said elongated handle means, and which comprises a first transmitting member pivotally attached at one end thereof to said elongated handle means and engaged at other end thereof to said lever, a first means to bias to a neutral position said first hand control means and which comprises an opposing pair of tensioning means applied to said elongated handle means, said tensioning means biasing said elongated handle means to a generally vertical orientation, a second means to bias to a neutral position said foot control means and which comprises an opposed pair of tensioning members for biasing said horizontal member to a predetermined position relative to said longitudinal member, a second transmitting means for the purpose of moving a lever on other of said computer joysticks to a position along a first axis of said other computer joystick, such position corresponding to angular position of said horizontal member of said foot control means, and which comprises a second transmitting member pivotally attached at one end thereof to said horizontal member of said foot control means and engaged at other end thereof to said lever, a second hand control means for controlling a throttle in said simulation program and which comprises:

a pivoting actuating member with handle means, a means for attaching said actuating member to said frame means, remote from said other computer joystick, a third transmitting means for the purpose of moving said lever of said other computer joystick to a position along a second axis of said other computer joystick, such position corresponding to angular position of said actuating member of said second hand control means, and which comprises a third transmitting member pivotally attached at one end thereof to said actuating member of said second hand control means and engaged at other end thereof to said lever.

5. The apparatus defined in claim 4 wherein said foot control means further comprises:

a left and right pedal means pivotally attached to said horizontal member equidistant from the pivot point of said horizontal member, a means for causing said pedal means during translational movement thereof to remain in a preset azimuthal orientation relative to said longitudinal member of said frame means.

6. An accessory apparatus for actuating a plurality of dual-axis analog computer joysticks which transmit electrical signals to a computer loaded with a flight simulation program viewed on a monitor, and where the user is seated on a seating means separate from but resting on said accessory apparatus, comprising:

a frame means which rests on floor and to which are structurally connected all components of said apparatus, said frame means being held stationary by transfer of said user's weight to said frame means by said separate seating means, and comprising a longitudinal member having laterally stabilizing means attached thereto, a foot control means for controlling a rudder in said simulation program and which comprises:
- a generally horizontal member pivotally attached to said longitudinal member of said frame means and which is manipulated by means of the user's feet,
- rollable supporting means which bear on said floor and which are attached to said horizontal member, to enable said horizontal member to rotate in a horizontal plane about its pivot point,
- a left and right pedal means pivotally attached to said horizontal member equidistant from the pivot point of said horizontal member,
- a means for causing said pedal means during translational movement thereof to remain in a preset azimuthal orientation relative to said longitudinal member of said frame means, a means to secure housings of two separate computer joysticks to said frame means, a first hand control means for controlling an elevator and ailerons in said simulation program and which comprises an elongated and generally vertical handle means pivotally attached to said longitudinal member of said frame means such that free end of said first hand control means can be moved in any horizontal direction, a first transmitting means for the purpose of moving a lever on one of said computer joysticks to a position corresponding to position of said free end of said elongated handle means, and which comprises a first transmitting member pivotally attached at one end thereof to said elongated handle means and engaged at other end thereof to said lever, a first means to bias to a neutral position said first hand control means and which comprises an opposing pair of tensioning means applied to said elongated handle means, said tensioning means biasing said elongated handle means to a generally vertical orientation, a second means to bias to a neutral position said foot control means and which comprises an opposed pair of tensioning members for biasing said horizontal member to a predetermined position relative to said longitudinal member, a second transmitting means for the purpose of moving a lever on other of said computer joysticks to a position along a first axis of said other computer joystick, such position corresponding to angular position of said horizontal member of said foot control means, and which comprises a second transmitting member pivotally attached to one end thereof to said horizontal member of said foot control means and engaged at other end thereof to said lever, a second hand control means for controlling a throttle in said simulation program and which comprises:
- a pivoting actuating member with handle means,
- a means for attaching said actuating member to said frame means, remote from said other computer joystick, a third transmitting means for the purpose of moving said lever of said other computer joystick to a position along a second axis of said other computer joystick, such position corresponding to angular position of said actuating member of said second hand control means, and which comprises a third transmitting member pivotally attached at one end thereof to said actuating member of said second hand control means and engaged at other end thereof to said lever.

7. The apparatus defined in claim 6 further comprising means to vary the lengths of said transmitting members of said first and said second transmitting means for the purpose of trimming said elevator and said rudder, respectively, in said simulation program.

8. The apparatus defined in claim 6 further comprising damping means applied to said foot control means and said first hand control means for the purpose of providing a sense of inertia of said foot control and first hand control means.

* * * * *